Figure 1:
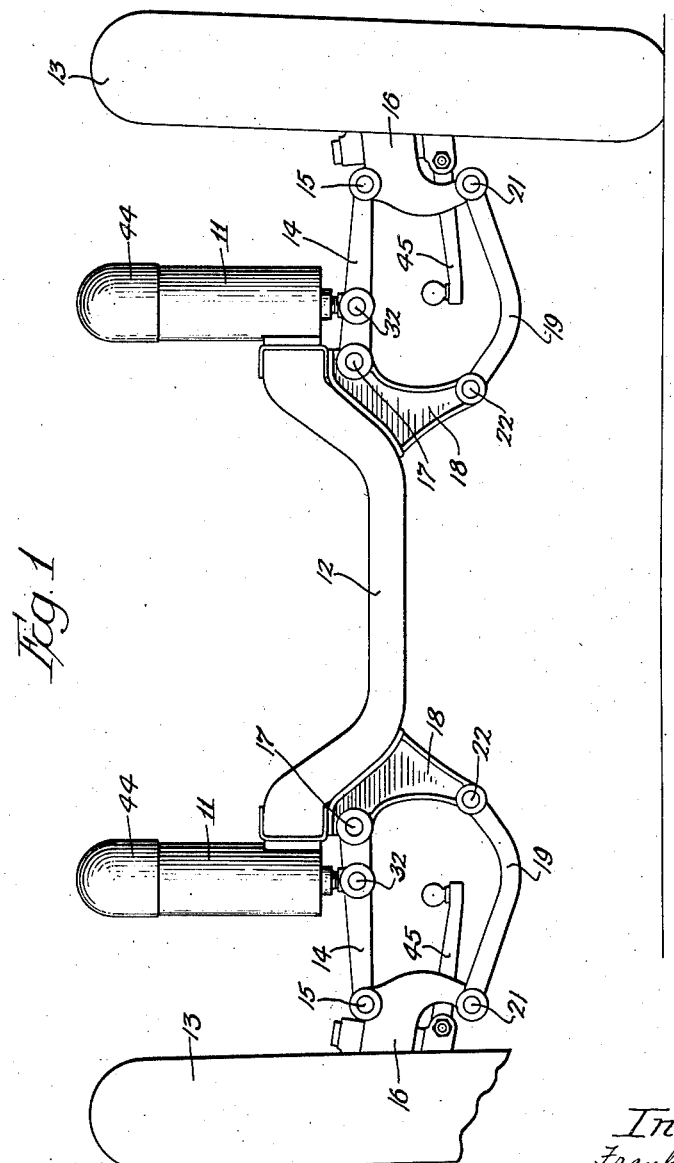

July 31, 1934.   F. B. BELL ET AL   1,968,631
FRONT SPRING FOR AN AUTOMOBILE
Original Filed Oct. 18, 1930    2 Sheets-Sheet 1

Inventors.
Frank B. Bell and
Dennis L. Hubbard

John C. Carpenter
Atty.

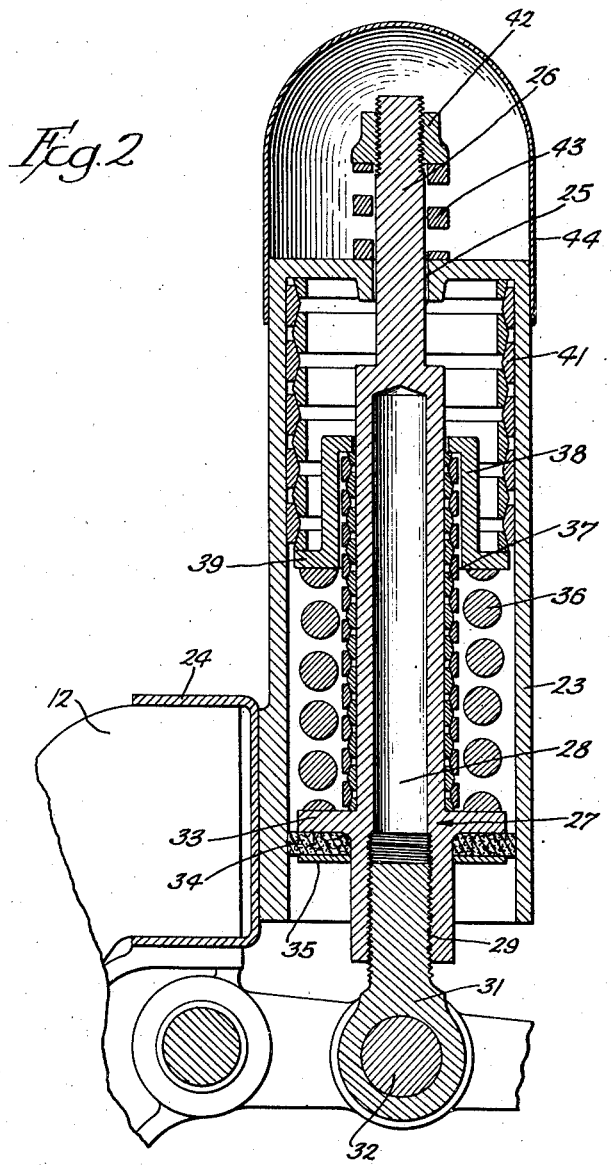

Patented July 31, 1934

1,968,631

UNITED STATES PATENT OFFICE 1,968,631

FRONT SPRING FOR AN AUTOMOBILE

Frank B. Bell and Dennis L. Hubbard, Pittsburgh, Pa., assignors to Edgewater Steel Company, Pittsburgh, Pa., a corporation of Pennsylvania Original application October 18, 1930, Serial No. 489,547. Divided and this application May 9, 1932, Serial No. 610,017

4 Claims. (Cl. 267—20)

This invention relates in general to spring assemblies and shock absorbing devices and while it will be hereinafter described as embodied in a spring assembly installed at the front end of an automobile, it will be apparent that it has other valuable application. This application is a division of my pending application for United States Letters Patent Ser. No. 489,547 filed October 18, 1930 for Front spring for an automobile.

The principal object of the present invention is the provision of a spring assembly for automobiles and other vehicles adapted to absorb and dissipate in friction the major portion of both minor vibrations and shocks and the more severe impacts and jars of service.

A further important object of the invention is the provision of a spring assembly of the character described which may be installed at the front of the chassis of an automobile to cushion the vibration and jars received by the front wheels.

Numerous other objects and advantages of the invention will be apparent as it is better understood from the following description, which, taken in connection with the accompanying drawings, discloses a preferred embodiment thereof.

Referring to the drawings:

Figure 1 is a schematic elevation showing spring assemblies embodying my present invention installed at the front end of an automobile; and Fig. 2 is a transverse enlarged vertical section through one of the spring assemblies shown in Fig. 1.

For the purpose of illustrating the present invention, there is shown on the drawings two spring assemblies generally indicated at 11 and arranged at opposite sides of a chassis part or axle 12. Reference characters 13 indicate the two front wheels of the vehicle and these wheels are connected to the chassis frame part 12 by upper links or connectors 14 pivoted respectively at 15 to king pin carrying members 16, and at 17 to a bracket 18 in turn fixed, and by lower links or connectors 19 which are similarly connected at 21 and 22 to the members 16 and 18.

Each spring assembly 11 comprises an outer spring housing 23 secured in any suitable manner as by a channel 24 to the frame part 12. Each housing 23 is provided at its top with an opening 25 through which a rod or stem 26 of a plunger 27 is arranged. The plunger 27 at its lower end is provided with a bore 28 threaded at 29 for engagement with a coupling or member 31 pivotally connected at 32 to the upper link or connector 14. The plunger or piston 27 consists or may consist of a flange 33 integral with the rod 26 and a packing 34 held in place by a disc 35 and in engagement with the inner surface of the housing 23.

In the present embodiment of the invention a coil or non-friction spring 36 and a ring or friction spring 37 are arranged in parallel and for conjoint action. A follower sleeve 38, having an outwardly extending flange 39, embraces the rod 26 and engages the springs 36 and 37. A second ring or friction spring 41 is arranged between the flange 39 and the upper end of the housing.

The ring springs 37 and 41 are preferably of the construction shown, described and claimed in United States Letters Patent to Ernest Kreissig No. 1,515,456, and particular description of them is not believed necessary. It may be mentioned, however, that they consist generally of alternately arranged outer and inner solid ring members having the tapered or bevelled interengaging faces shown, spring action being accomplished by the stretching and compression of the metal forming the individual rings. Spring 37 is relatively weaker than the spring 41 and this spring with the non-friction coil spring 36 absorbs and cushions the minor vibrations and shocks of the vehicle when travelling over relatively smooth roads and pavements, the heavier jars and impacts being absorbed by friction ring spring 41.

The upper end of the rod 26 is engaged by a nut 42 and a coil spring 43 is preferably arranged between this nut and the upper end of the housing. A cap 44 is or may be provided to enclose the upper end of the rod 26 and the spring 43.

The spring assembly is secured, as has been described, to the chassis and is connected to the upper link connectors. No special construction of the chassis or of the link connectors is required. Further, it will be apparent that thus arranged power mechanism may be arranged from the chassis to the front wheels, and that the usual steering mechanism 45 may be employed.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a spring assembly, the combination of a casing having an abutment at one end thereof, a plunger extending through said casing and also having an abutment at one end thereof, a relatively light friction ring spring encircling said plunger for frictional engagement therewith and having one end thereof disposed in seating engagement with the abutment on said plunger, a follower mounted on said plunger and disposed in seating engagement with the other end of said relatively light friction ring spring, and a relatively heavy friction ring spring disposed in seating engagement with the opposite side of said follower and with the abutment of said casing for frictional engagement with the inner walls of said casing, said light ring spring being adapted to be compressed under minor shocks and vibrations transmitted through said plunger into frictional engagement with said plunger and under major shocks and vibrations to a degree where the rings thereof abut one another to provide a rigid column for transmitting the force of said heavy shocks in a rectilinear direction through said follower to said heavy friction ring spring to cause the same to frictionally engage said sleeve and absorb said heavy shocks.

2. In a spring assembly, the combination of a casing having an abutment at one end thereof, a plunger extending through said casing and also having an abutment at one end thereof, a relatively light friction ring spring encircling said plunger for frictional engagement therewith and having one end thereof disposed in seating engagement with the abutment on said plunger, a follower mounted on said plunger and disposed in seating engagement with the other end of said relatively light friction ring spring, and a relatively heavy friction ring spring disposed in seating engagement with the opposite side of said follower and with the abutment of said casing for frictional engagement with the inner walls of said casing, said light ring spring being adapted to be compressed under minor shocks and vibrations transmitted through said plunger into frictional engagement with said plunger and under major shocks and vibrations to a degree where the rings thereof abut one another to provide a rigid column for transmitting the force of said heavy shocks in a rectilinear direction through said follower to said heavy friction ring spring to cause the same to frictionally engage said sleeve and absorb said heavy shocks, and means for absorbing the recoil of said parts.

3. In a spring assembly, the combination of a casing having a shoulder at one end thereof, a plunger extending through said casing and also having a shoulder at one end thereof, a relatively light friction ring spring encircling said plunger for frictional engagement therewith and having one end thereof disposed in seating engagement with the shoulder on said plunger, a relatively light coil spring arranged concentrically with respect to said light ring spring and having one end thereof disposed in seating engagement with the shoulder on said plunger, a follower mounted on said plunger and disposed in seating engagement with the other end of said relatively light friction ring spring and also in seating engagement with said relatively light coil spring, and a relatively heavy friction ring spring disposed in seating engagement with the opposite side of said follower and with the shoulder of said casing for frictional engagement with the walls of said casing, said light ring spring being adapted to be compressed under heavy shocks transmitted through said plunger to a degree where the rings thereof abut one another and resist further compression, thus protecting said light coil spring from excessive compression and providing a rigid column for transmitting the force of said heavy shocks in a rectilinear direction through said follower to said heavy friction ring spring to be absorbed thereby.

4. In a spring assembly, the combination of a casing having a shoulder at one end thereof, a plunger extending through said casing and also having a shoulder at one end thereof, a relatively light friction ring spring encircling said plunger for frictional engagement therewith and having one end thereof disposed in seating engagement with the shoulder on said plunger, a relatively light coil spring arranged concentrically with respect to said light ring spring and having one end thereof disposed in seating engagement with the shoulder on said plunger, a sleeve mounted on said plunger and having a shoulder at one end thereof disposed in engagement with the other end of said relatively light friction ring spring and a shoulder at the other end thereof for seating engagement with said relatively light coil spring, a relatively heavy friction ring spring disposed in seating engagement with the opposite side of one of the shoulders of said sleeve and with the shoulder of said casing for frictional engagement with the walls of said casing, said light ring spring being adapted to be compressed under heavy shocks transmitted through said plunger to a degree where the rings thereof abut one another and resist further compression, thus protecting said light coil spring from excessive compression and providing a rigid column for transmitting the force of said heavy shocks in a rectilinear direction through said sleeve to said heavy friction ring spring to be absorbed thereby, and means for absorbing the recoil of said parts.

FRANK B. BELL.
DENNIS L. HUBBARD.